United States Patent Office 3,564,645
Patented Feb. 23, 1971

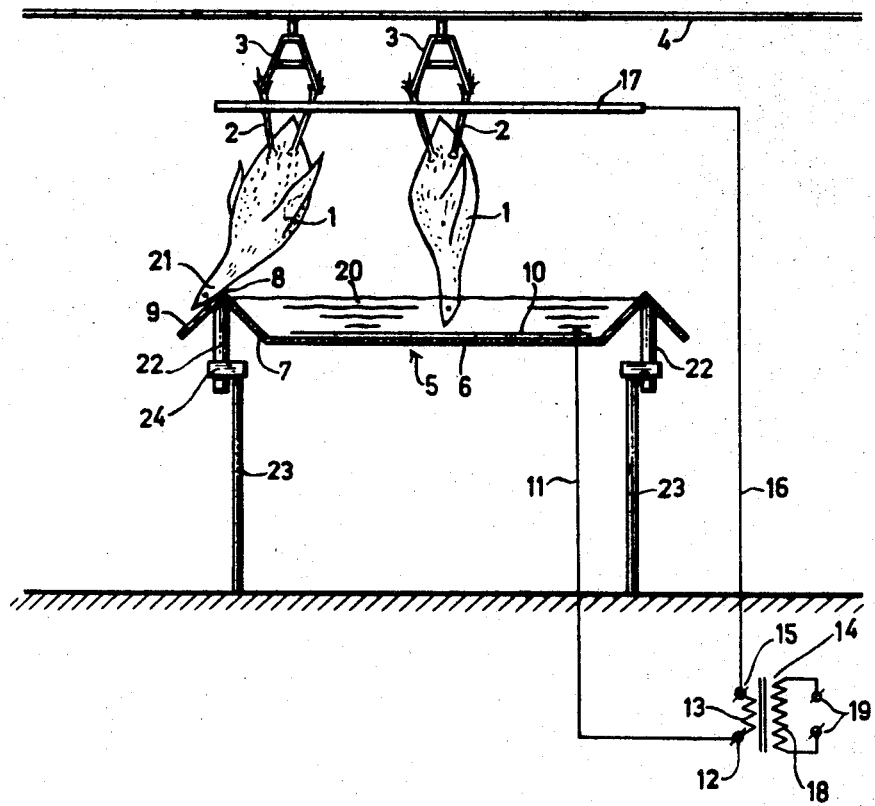

3,564,645
DEVICE FOR THE ELECTROCUTION OF POULTRY
Bram J. M. G. Brugman, Boxmeer, Netherlands, assignor to Stork Amsterdam N.V., Amsterdam, Netherlands
Filed Sept. 9, 1968, Ser. No. 758,309
Claims priority, application Great Britain, Aug. 12, 1968, 38,552/68
Int. Cl. A22c 21/00
U.S. Cl. 17—11                    4 Claims

ABSTRACT OF THE DISCLOSURE

A device for the electrocution of poultry, to which the poultry are supplied, hanging by their legs on a conveyor track, comprising a basin filled with electrically conductive liquid which is connected to one pole of an electrical source, the poultry being electrocuted by plunging their heads into the liquid, while their legs simultaneously are being connected to the other pole of the electrical source.

---

My invention relates to a device for the electrocution of poultry to which the poultry is supplied via a conveyor track hanging by their legs in such a way that they are, with a part of their body, brought into contact with a first electrode connected with the one pole of an electrical source and with another part of their body are brought into contact with a second electrode connected with the other pole of an electrical source so that the animals are anaesthetized by the current, flowing through their bodies.

A device is known in which the animals, hanging on a conveyor track, are compelled to pass with their heads through a bundle of conductive, resilient, wires. It is, of course necessary that there is a proper contact between the head and the wires, but since the animals do not hang quietly on the conveyor, it frequently occurs that they evade the wires so that they are not all, or insufficiently anaesthetized. Furthermore the wires, the ends of which do not easily penetrate the feathers, provide only a very small contact surface with the head of the animals so that a relatively high voltage (in the order of two thousand volts) must be used to ensure that a current, large enough to have sufficient anaesthetizing effect, passes through the body of the animal. Very often the body of the animal shows burns on the places where the wires contact the body, which burns spoil the appearance of the slaughtered animal.

My invention aims to overcome this trouble. For that reason a device according to the invention comprises a basin, positioned at a certain distance beneath the conveyor track and filled with an electrically conductive liquid, and said liquid being electrically connected to the first pole of an electrical source, while at least one of the legs of the animal is connected to the other pole of said electrical source, when the head of the animal is immersed in the liquid.

When an animal approaches the basin it is plunged with its head into the liquid. At this moment a current passes through the head, which instantly anaesthetizes the bird. As a result of the very large surface over which the head of the animal is into contact with the bird a very low voltage can be used; in practice it has been shown that a voltage of 40 to 45 volts suffices. The device is therefore perfectly safe to operate.

As a result of the fact that the current passes through the entire part of the head, the brain cells of the birds are paralysed; the heart, however, continues to beat. When, after the anaesthetizing process, the main artery of the bird is severed the bird quickly and painlessly bleeds to death.

The large contact surface and the low voltage ensure that no burns occur on the body or the head of the animal.

My invention aims to provide a basin which is constructed from, or is covered with, an electrically insulating material, while said basin contains an electrode, which is into contact with the liquid in the basin and is connected with the first pole of the electrical source.

A further aim of my invention is to provide a basin, the front wall of which is inclined with respect to the bottom, the basin being further provided with a downwardly directed, inclined, front plane. This has the advantage that it is assured that the head of the bird is suddenly plunged into the liquid.

A more complete understanding of my invention, and of further objects and features thereof can be obtained from the following description of an illustrative embodiment thereof, when considered in connection with the accompanying drawing which shows schematically a device according to the invention.

The animals 1, which are to be anaesthetized, are suspended with their legs 2 on a shackle 3. This shackle is suspended on a conveyor track 4.

Beneath the conveyor track is positioned a basin 5 with the bottom 6 and an inclined front wall 7. The upper edge 8 is preceded by the inclined front plane 9. The basin 5 is made from electrically insulating material; on the bottom of it rests a metal plate 10 which is connected, through the electrical lead 11, to the terminal 12 of the secondary winding 13 of an electric transformer 14. The other terminal 15 of this winding is earthed; it is furthermore, through the lead 16, connected to the longitudinal electrode 17, which is positioned at a certain, adjustable, distance above the basin 5. The primary winding 18 of the transformer 14 can be connected to the mains by the terminals 19.

The voltage of the secondary winding of the transformer is about 40 to 45 volts; this voltage difference exists also between the electrically conductive fluid 20, with which the basin is filled, and the metal electrode 17. When an animal 1 approaches the basin its legs 2 are into contact with the electrode 17, but its head 21, which bears against the front plate 9, lags behind with respect to the movement of the legs 2. Therefore, after the shackle 3 has covered a certain distance, the head 21 suddenly passes the ridge 8 between the planes 7 and 9 and is plunged into the water 20. Current then passes through the head of the animal to the legs; the animal is instantly anaesthetized. The basin 5 is supported by the supports 22, 23; a device 24 makes it possible to adjust the distance between the basin 5 and the conveyor track 4 at will to adapt the device to bigger and smaller birds.

Having thus described the invention and manner of its operation what I claim as my invention is:

What I claim is:

1. In a device for the continuous electrocution of poultry, conveyor track means for suspending individual ones of poultry by their legs, a basin having an inner surface of electrically insulating material positioned at a distance below said conveyor track means so that the heads of the poultry are immersed in the liquid as they pass over the basin, an electrically conductive liquid within said basin and electrically conneced to a first pole of an electrical source, means for connecting at least one of the legs of each one of the poultry to the other pole of the electrical source when the head of that one of the poultry is immersed in the liquid, the inner surface of the basin sloping inwardly from the forward edge thereof with respect to the movement of the poultry on the conveyor track means, and an inclined surface at the forward edge of the basin extending downwardly and outwardly therefrom so that the heads of the poultry are suddenly plunged into the basin liquid as the heads pass over the ridge between the inclined surfaces at the forward edge of the basin.

2. A device according to claim 1, said basin being constructed from an electrically insulating material, said basin containing an electrode, which is into contact with the liquid in the basin and is connected with the first pole of the electrical source.

3. A device according to claim 1, comprising an oblong electrode positioned above the basin, said electrode being parallel to the conveyor track and positioned in such a way that, when the head of the animal plunges into the liquid at least one of the legs of the animal is in contact with said electrode.

4. A device according to claim 1, the voltage source supplying an alternating voltage with a voltage of 40 to 45 volts.

References Cited
UNITED STATES PATENTS

| | | | |
|---|---|---|---|
| 1,680,594 | 8/1928 | Connolly et al. | 43—98 |
| 1,949,985 | 3/1934 | Weber | 17—1(E) |
| 2,335,993 | 12/1943 | Bland et al. | 17—11 |
| 2,471,640 | 5/1949 | McFadden | 43—98 |

LUCIE H. LAUDENSLAGER, Primary Examiner

U.S. Cl. X.R.

17—1